United States Patent [19]
Granberg

[11] 3,774,709
[45] Nov. 27, 1973

[54] LIVE AXLE DRIVE SYSTEM
[75] Inventor: Donald R. Granberg, Ohio
[73] Assignee: Koehring Company, Milwaukee, Wis.
[22] Filed: Jan. 5, 1972
[21] Appl. No.: 215,582

[52] U.S. Cl................................ 180/53 WA, 74/13
[51] Int. Cl............................................ B60k 25/08
[58] Field of Search ................ 74/13, 14; 180/53 A, 180/53 B, 53 D, 53 WA

[56] References Cited
UNITED STATES PATENTS
2,785,525    3/1957   Sorensen................................. 74/13
FOREIGN PATENTS OR APPLICATIONS
183,259     9/1955   Germany........................ 180/53 WA Primary Examiner—Manuel A. Antonakas
Assistant Examiner—Allan Russell Burke
Attorney—Jerome P. Bloom

[57] ABSTRACT

A wheel mounted work unit features operating components arranged to selectively respond to wheel movement. As illustrated in a farm implement in the nature of a fertilizer spreader, operating components thereof have a directly coupled live axle drive. The drive axle mounts for rotation in and relative to a supported wheel element, which in turn mounts a separable coupling device. The coupling device is so arranged that a simple release thereof from a latched position produces a direct drive of the live axle, which drive is proportioned to wheel movement.

8 Claims, 9 Drawing Figures

PATENTED NOV 27 1973

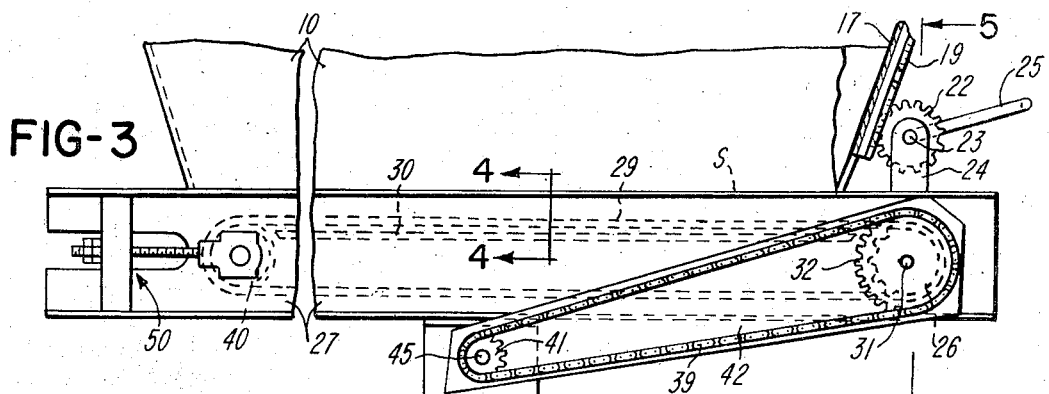
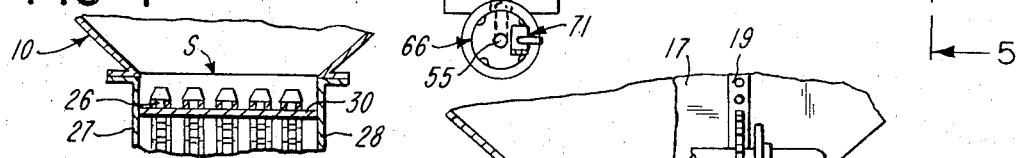
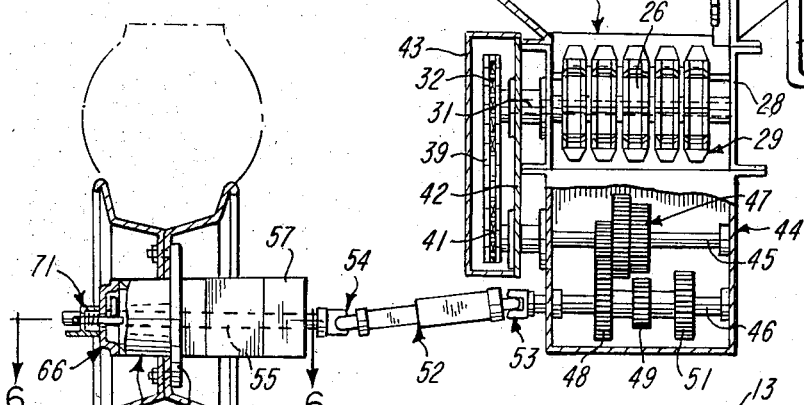
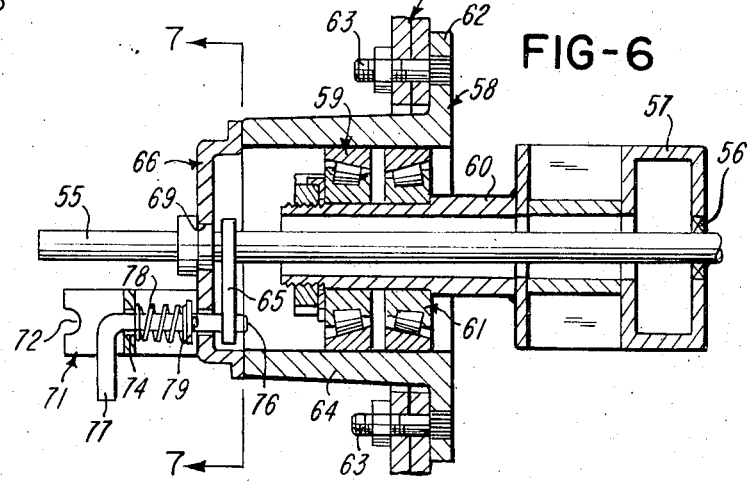
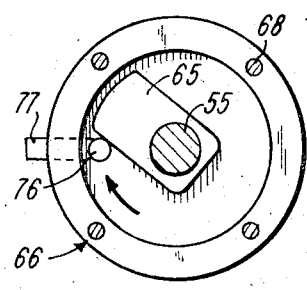
FIG-3
FIG-4
FIG-5
FIG-6
FIG-7

LIVE AXLE DRIVE SYSTEM

BACKGROUND OF THE INVENTION

This invention relates to improvements in drive systems for operating equipment embodied, in particular, in mobile work units, although not so limited. It has special application to farm equipment wherein rotary movements of a wheel or wheels have been used to operate conveyors, feed augers, or other apparatus having a work function.

To highlight its advantageous features, the invention will be illustrated by way of a preferred embodiment in a fertilizer spreader which depends for its movement on being hitched to and drawn by a tractor. Such spreader receives therein a load of fertilizer which is discharged by a chain conveyor to spinning distributor discs mounting to the rear and externally of the spreader body. In the prior art it has been known to effect the drive of such a conveyor by a power take off through the medium of a small diameter wheel applied in frictional engagement to the outer periphery of one of the wheels supporting the spreader. However, such a drive is relatively inefficient and in most cases has led to a considerable maintenance problem. For example, since the fields are often covered by moisture and the terrain is usually rough, the spreader wheels become slippery and bounce. As a result the power take off wheel often times slips and bounces. The end effect is a poorly functioning conveyor drive and severe and rapid wear of the drive components. It even produces tire "blow outs." With the jolting involved, an even fertilizer spread is impossible and there is erratic power transmission and consequent reflected vibration causing heavy bearing loads on the related axle and other parts. Further, the conventionally designed drive system applied to the described purpose is of necessity so exposed to lend itself to frequent physical contact and damage by the environment of its use and the elements. There have been chain and sprocket arrangements involved in drive systems such as subject of this discussion but these have been so designed as to be subject to frequent wear and breakage.

Prior art devices of the character described do not, in general, readily lend themselves to adjustability, to ease of coupling and uncoupling of the auxiliary drive systems employed, or to powering thereof from an outside source. Such problems are also the target of the present invention.

SUMMARY OF THE INVENTION

The present invention, in a preferred but not necessarily an only application here illustrated, provides for a simple, direct and positive drive of a feed conveyor for unloading and discharging farm chemicals contained in a towed farm vehicle which is supported by four wheels to lend it mobility. The invention drive system, while utilizing rotation of a supporting, ground engaging wheel of the vehicle as a power source, has its power take off directed from the wheel through a live axle drive which is fully protected and can be readily enabled or disabled as to its function. Simple but unique coupling means are employed for the latter purpose which in one position fully disconnects from the live axle and in a released position provides for an automatic positive drive from the wheel to this live axle. The physical embodiment of the drive system affords a relatively long and maintenance free life for the components thereof.

A primary object of the invention is to provide a selectively energizable auxiliary drive system for use to optimal advantage in mobile work units, which system is economical to fabricate, more efficient and satisfactory in use and minimizes the chance of malfunction.

Another object of the invention is to provide a live axle drive system having particular advantage for use in mobile work units characterized by minimal maintenance requirements.

A further object of the invention is to provide means for a live axle take off of power from a rotating wheel on a selective basis which enables a more direct and positive and a more uniform drive therefrom to related apparatus.

Another object of the invention is to utilize the principal of a live axle drive in transmitting the rotary motion of a ground engaging vehicle wheel to operating mechanism carried by the vehicle in a manner to simply enable or disable said operating mechanism.

An additional object of the invention is to provide in a live axle drive system the motor power for which is furnished by a rotatably mounted wheel, a novel hub cap assembly for such wheel including latched means the release of which will automatically result in a powering of the live axle on turning of the wheel.

Another object of the invention is to provide an improved drive system of the character described which is particularly applicable to mobile work units possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings wherein is shown one but not necessarily the only form of embodiment of the invention, FIG. 1 is perspective view of a fertilizer spreader embodying the drive system of the present invention;

FIG. 3 is another fragmentary view taken in side elevation to show various details of the spreader which are pertinent to operation thereof for its intended purpose;

FIG. 4 is a view taken on line 4—4 of FIG. 3;

FIG. 5 is a further sectional view of said drive mechanism taken in transverse section;

FIG. 6 is a view taken along line 6—6 of FIG. 5;

FIG. 7 is a sectional view taken substantially along line 7—7 of FIG. 6;

Figure 1:
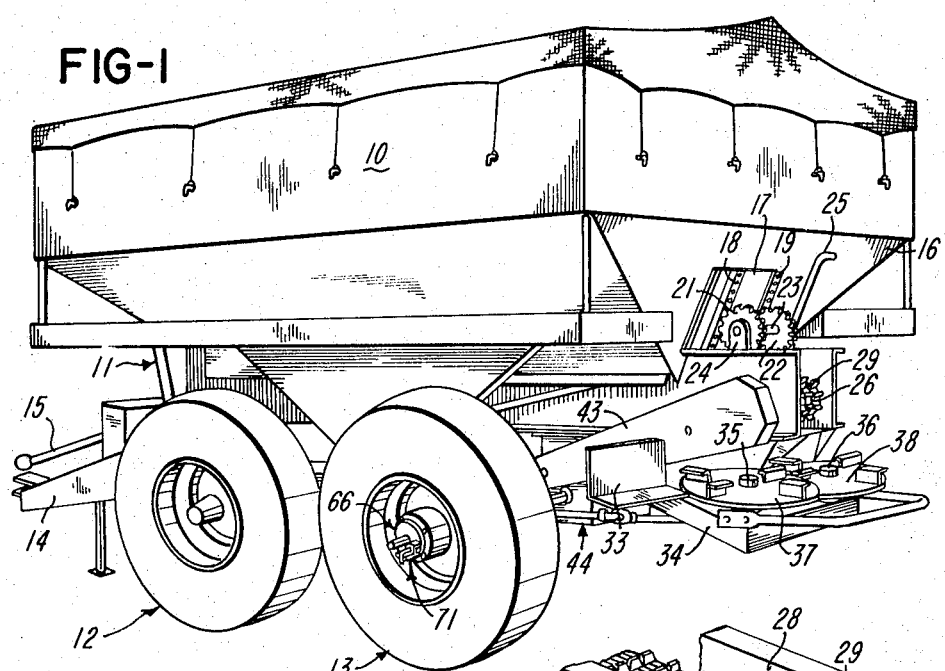

The invention as disclosed is embodied in a farm vehicle constituting a mobile work unit in the nature of a fertilizer spreader. The spreader per se is unpowered and depends for its movement on being hitched to a tractor unit. In form, the spreader is comprised essentially of a large hopper 10 mounted on four wheels. In cross section the lower portion of the hopper has convergent sides the lower limits of which define a longitudinal slot S in the bottom of the hopper and have connected therewith plates 27 and 28 which respectively depend therefrom in spaced parallel relation. As will be more particularly described, an endless chain-type conveyor assembly 29 mounts between the plates 27 and 28 in nested protected relation and to have its uppermost run pick up and carry the fertilizer or other chemical loaded in the hopper to and through an opening to the rear of the hopper. At this point the fertilizer or chemical is discharged onto horizontal rotating discs 37 and 38 to be flung out or broadcast thereby. As will be self evident, the broadcast pattern and the depth of concentration of the fertilizer achieved is determined by variables such as speed of movement of the spreader unit, the rate of feed to the distributor discs and rotational speed of the latter. The invention is, of course, illustrated in application to provide an improved wheel powered drive of the embodied conveyor in a mobile farm work unit. However, as previously mentioned, it is for illustrative purposes only since the invention has an obvious general utility for other applications.

More particularly, the illustrated spreader is shown to have the hopper 10 formed as a longitudinally extended body rested on and supported by a frame 11. The frame is a composite beam structure providing at the same time a chassis and a housing for protection of certain portions of the functional structure essential to the operation of the unit. Note that only those portions of the frame will be described in detail as appear to be pertinent and necessary to the understanding of the present invention.

The hopper 10 and frame 11 are supported for rolling movement on a forward pair of wheels 12 and a rearward pair of wheels 13. A hitch 14 at the forward end of the frame adapts the same for connection with a farm tractor or other towing vehicle. The hitch structure serves also to mount a shaft means 15 constituting a power take off serving as an operative connection to certain functional equipment in the towed vehicle.

At the rear end thereof the hopper 10 includes an upwardly and rearwardly inclined wall portion 16 in which there is a rectangular opening the lower limit of which opens to expose the conveyor chain 29 to which the material contents of the hopper are directed under the influence of gravity. This last mentioned opening is selectively closed, to the extent desired, by a vertically movable plate constituting a gate 17. The gate 17 bears in appropriate guides to either side of the opening and includes a pair of rack elements 18 and 19 fixed in a laterally spaced apart parallel relation on its outermost face. The rack elements include an identical series of longitudinally spaced apertures through the medium of which they are respectively engaged by pin wheels 21 and 22. The latter mount on a shaft 23 supported in a bracket means 24 fixed to the rear of the hopper on the upper surfaces of parallel beams vertical plate portions of which afford the previously mentioned plates 27 and 28. A crank 25 integrally connected with one end of the shaft 23 serves as the medium for rotating the shaft and inducing thereby a selected position of the gate 17 to expose as much or as little of the rear end hopper opening in the wall 16 as desired.

As pointed initially, through the medium of the longitudinally extended slot S, the hopper 11 is open at its bottom and connecting the plates 27 and 28 below the extremities of its convergent sides is a plate 30 which serves to guide the upper run of the chain belt conveyor assembly 29. As will be seen in FIG. 3, the forwardmost end of the conveyor chain assembly 29 is guided by an assembly of sprocket wheels 40 while the rear end of the belt 29 is guided over an assembly of sprocket wheels 26. The latter are fixedly mounted to a shaft 31 extending through and bearing in the plates 27 and 28 to either side of the conveyor belt. One projecting end of the shaft 31 has secured thereto a gear 32. As seen, the shaft 31 is driven through the medium of the gear 32 whereby to induce a movement of the conveyor chain belt assembly 29 the length of the hopper within the slot S and between the plate elements 27 and 28. As will be seen, the chain belt 29 extends rearwardly from the hopper immediately beneath the gate 17. Depending on the extent that the gate 17 is raised from the upper run of the conveyor belt, this will determine the amount of material that is carried from the hopper and dumped to its rear.

To the rear of the hopper and extending transverse thereto, the frame 11 incorporates a beam portion 33 from which projects an extension 34. The frame extension 34 mounts a pair of transversely spaced distributor discs 37 and 38 fixed to rotatable driving stub shafts 35 and 36. The disc units 37 and 38 position immediately to the rear of and immediately below the rear extremity of the conveyor assembly 29, in a position that discharging material will drop thereon. The discs incorporate slinger vanes. Accordingly, as the chemical materials from the hopper 10 are caused to drop from the conveyor as the upper run thereof moves onto the sprocket wheels 26, the material will drop on the distributor discs. In this case the stub shafts 35 and 36 of the distributor disc units are suitably driven through a transmission train including the shaft means 15. Thus, as the shaft means 15 is powered, discs units 37 and 38 are correspondingly being driven to rotate and as the chemicals are dropped on their upper surfaces, the vanes as well as the discs themselves cause the materials to be broadcast or thrown to the rear and to the sides of the spreader, in a generally fan shaped pattern.

Of course, suitable means such as 50, here illustrated, will be utilized to adjust the position of the idler sprocket wheel assembly to provide the necessary tension on the conveyor chain belt to produce the most effective delivery of the fertilizer or other contained chemicals from the hopper to the distributor discs.

Figure 2:
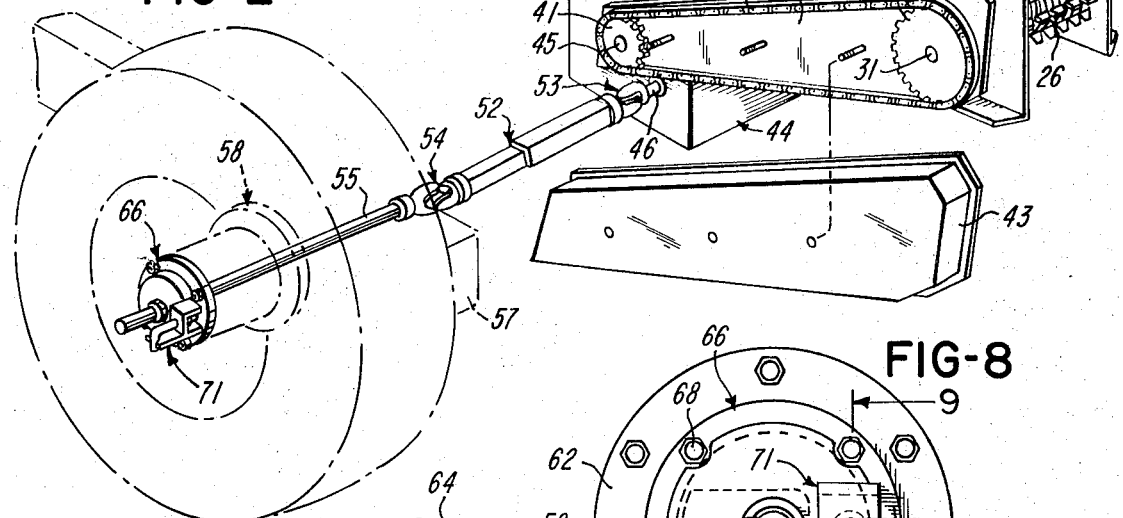
FIG. 2 is an enlarged fragmentary view, taken in perspective, showing the general association of the elements in said drive system.
Figure 9:
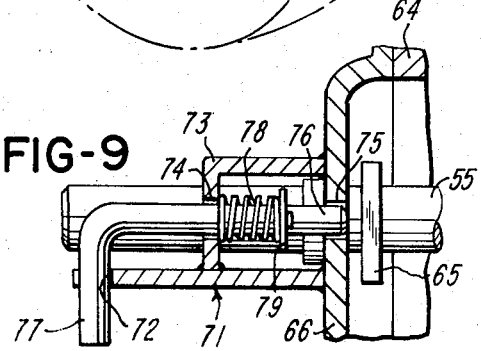
FIG. 9 is a sectional view taken along 9—9 of FIG. 8.
Figure 8:
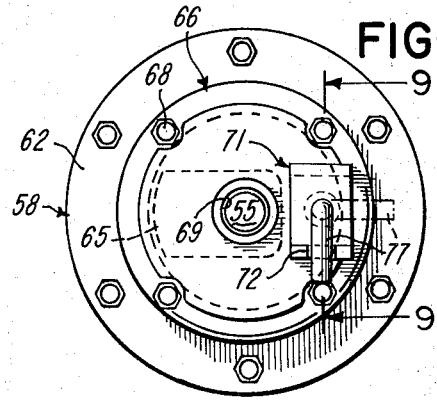
FIG. 8 is an elevation view of the hub cap assembly comprised in the invention embodiment.

Having generally described the environment and function of the operating apparatus of the spreader, attention is now directed to the live axle drive system of the invention as here embodied. Referring now to FIGS. 2 and 5, it may be seen that the gear 32 is a relatively large gear about which is looped one end of a continuous chain 39 the opposite end of which loops about and is cooperatively engaged to the sprocket gear 41 which is spaced to the rear of and co-planar with the gear 32. To the side thereof most adjacent the portion of the frame 11 including the plates 27 and 28, the gears 32 and 41 are shielded by a plate section 42 which is capped by cover 43 to form a complete housing for the gears 41 and 32 and the continuous chain 39. Of course, the housing portions are suitably connected for a ready release of the cap portion 43 and the housing portion 42 is suitably fixed in reference to the frame 11. Since the details thereof are not themselves required for understanding the present invention, they will not be further described. The housing portion 42 does have an aperture for passage therethrough of the shaft 31 which mounts to one end thereof the gear 32. It also has an aperture for the passage therethrough of the shaft 45 which mounts the sprocket gear 41. Supported to depend from the frame 11 to the chassis side of the housing plate 42 is a multi-speed transmission unit 44. The shaft 45 is in fact the output shaft of the transmission unit 44 while the transmission input shaft 46 is shown in FIG. 2 to project from the transmission housing at a position spaced below the shaft 45 and the housing structure enclosing the chain 39 and its drive sprocket. It is to be understood that the transmission unit 44 may be of any conventional nature to suit the intended application. For purposes of this disclosure and to give a realistic environment for the invention drive system, the transmission unit is generally diagramatically shown to include cluster gear means 47 on the output shaft 45 and spaced apart gear elements 48, 49 and 51 on the input shaft 46. Through generally conventional means, which is unnecessary here to consider, the cluster gear, means 47 may be shifted relatively to the gear elements 48, 49 and 51 to establish a selected drive train within the transmission unit whereby to achieve a given speed of rotation of the output shaft 45 in correspondence with the speed of rotation directed to the input shaft 46.

In connection with the input shaft 46, by way of a universal joint 53, is a telescoping shaft 52 the components of which are rectangular in cross section. The shaft 52 extends laterally and outwardly from the transmission unit 44, in the case illustrated, to the left rear wheel 13. The outermost end of the shaft 52 is connected through a universal joint 54 to one end of a shaft constituting a live axle 55. The remote end of the axle 55 is projected through a bearing 56 and a sleeve 60 in connection with a portion 57 of the frame 11. The axle 55 projects beyond the sleeve 60 which mounts bearing element 59 and 61 to rotatably support the hub 58 of the rear wheel 13. The hub 58 includes a flange 62 applied to the inner face of the wheel and bolts 63 are projected through aligned openings and on the application thereto of lug nuts serve to secure the wheel and the hub together. The hub 58 further includes a cylindrical projecting portion 64 which extends outwardly of and beyond the wheel opening and it is through this portion 64 that the live axle projects.

Fixed over the open outer end of the hub portion 64 is a hub cap assembly 66. The latter is in the form of an outwardly dished plate having a peripheral lip which is secured to the portion 64 by bolts 68. This plate includes the central opening 69 through which the live axle 55 projects relative the hub cap. Fixed within the opening 69 and to the hub cap are suitable bearing means which together with the bearing means 56 provide a stable bearing support for the live axle which, in turn, thereby provides for a supporting influence on the wheel 13.

Fixed to the outermost face of the hub cap plate, displaced radially from the opening 69, is a bracket 71 having an h-shape. This bracket projects laterally and perpendicularly and has a notch 72 formed in the outermost extremity of its elongated back portion. Considering the bracket 71 in cross section as having the form of a chair, in its seat portion is an opening 74 in direct alignment with an opening 75 in the hub cap. Extending through the openings 74 and 75, and in sliding bearing relation to the bracket 71 and the hub cap, is one arm 76 of a rod-like control element the other arm 77 of which is bent at right angles to form a handle therefor. Fixed intermediate the length of the arm 76 by suitable means is a washer like element 79. Interposed between the washer 79 and the seat portion of the h-shaped bracket 71, about rod-like arm 76, is a compression spring. On grasping the handle portion 77 and pulling up on the right angled rod portion 76 thereof to compress the spring 78, the handle 77 may be disposed in the notch 72 in the outermost end of the bracket member 71. With the spring 78 under compression and the handle portion 77 lodged in the notch 72, the innermost end of the arm 76 is disposed within the opening 75 in the hub cap 66. On release of the handle 77 from its latched position in the notch 72 of the bracket 71, and rotation thereof in an obvious manner, the compression spring 78 will influence the arm 76 to project inwardly of the hub cap in the manner of a plunger.

Fixed perpendicular to and projecting radially in a plane transverse to the live axle 55 is a narrow plate defining an arm 65. As will be seen, if the member 76-77 is unlatched and the portion 76 projected inwardly of the hub cap, in such position it projects beyond the plane of the arm 65. Thus, on rotation of the wheel 13 mounting this hub cap there will be an eventual engagement of one side of the arm 65 by the plunger arm 76 and thereby a drive of the live axle. By simply pulling out on the handle 77 and latching the same in the notch 72, there will be a quick and clean disconnect of the wheel from the live axle.

In the operation of the self contained drive system for the conveyor belt 29, therefore, the drive of the belt can be made effective and ineffective at will in a most simple manner, the arm 77 being readily accessible at the outer surface of the hub on the left rear wheel. When the handle 77 is unlatched and the compression spring takes over, the plunger portion 76 of the control element will on movement of the related wheel 13 move into engagement with one side of the arm 65 and turn the live axle which is in bearing relation to the wheel through the hub cap 66. Accordingly, as long as there is a continuing forward movement of the fertilizer spreader and a release position of the handle 77, there will be a positive rotation of the live axle and correspondingly a drive through the connected transmission elements to the sprockets 26 and the conveyor belt assembly. The drive will be maintained irrespective of the irregular terrain and without undue wear or burden on any of the components of the drive system or of the wheel structure which is arranged to furnish the motor power. Thus, there will be a constant and uniform movement of the conveyor belt assembly to move fertilizer from the hopper 10 to the distributor discs 37 and 38. The speed of movement of the conveyor belt can be readily set or predetermined by suitable adjustment of the transmission gears and the nature of the drive of the live axle. The other variable will be the setting of the gate 17 to control the outflow of the fertilizer. Take particular note that the nature and arrangement of the elements of the drive system is such that the same is fully enclosed and protected from damage due to flying rocks, vibration or weather. No undue loads are imposed in any case upon the live axle which is fully protected in the environment of its position.

Attention is directed to the fact the live axle lends itself also to the connection of an external power source for a temporary drive thereof; for example, to unload the hopper of excess or unused material in a stationary or idle position of the work unit.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

I claim:

1. In a mobile work unit including a ground engaging wheel, operating equipment, a direct drive system extending from one side of said wheel to said operating equipment selectively made operable for a transmission of power, said system including a live axle rotatable independently of said wheel and having one end extending toward said equipment and the other end projecting through and beyond said wheel to the other side thereof, means mounted on said wheel adjustable to and from a position to couple with said live axle to produce movement thereof in correspondence with turning movement of said wheel, and a projecting end of said live axle to the other side of said wheel providing means also for selective power rotation thereof independent of wheel rotation, as and when required.

2. A mobile work unit according to claim 1, wherein said means mounted on said wheel includes a handle portion projecting to the said other side of said wheel in adjacent substantially parallel relation to the said projecting end of said live axle to be readily accessible for hand adjustment.

3. A mobile work unit according to claim 2, wherein said means mounted on said wheel includes a pin adjustable axially in a line parallel to and radially offset from the axis of said live axle, and a laterally projecting arm made fast on said live axle to the said one side of said wheel to be placed in a driven relation to said pin, said pin extending through said wheel and being axially adjustable into and out of the plane of said arm.

4. A mobile work unit according to claim 3, characterized by a hub on said wheel projecting to the said outer side of said wheel and forming an enclosure receiving said laterally projecting arm, said live axle extending through and beyond said hub in the axis thereof, said pin mounting to an end wall of said hub along side said live axle and extensible through said end wall for projection into said enclosure.

5. A mobile work unit according to claim 4, characterized by a frame having a tubular portion in surrounding relation to said live axle, said wheel having a rotary bearing on said tubular portion and said live axle having a rotary bearing at longitudinally spaced locations in said frame and in said hub.

6. A mobile work unit according to claim 5, wherein said operating equipment drive system further includes a frame mounted multi speed transmission means and universally connected shaft means constituting an extension of said live axle to said transmission means.

7. A mobile work unit having operating equipment, including a frame providing a laterally projecting tubular portion, a work unit supporting ground engaging wheel rotatably mounted on said tubular portion of said frame and having a hub projecting to an exterior side thereof in the wheel axis, said wheel having an interior side facing said frame, an operating equipment drive system extending from said wheel on its interior side and including a live axle relatively rotatably received in said tubular portion of said frame, an arm made fast to said live axle and projecting laterally thereof within an enclosure as defined by said hub, and a pin mounted to an end wall of said hub and extensible and retractable relatively thereto in a sense parallel to said live axle to project and withdraw an end of said pin within said hub enclosure into and out of the plane of said arm, said pin including a handle accessible at the exterior side of said wheel for convenient projecting and withdrawing adjustment.

8. A mobile work unit according to claim 7, wherein said live axle disposes in the wheel axis within said tubular portion of said frame and has a rotary bearing at longitudinally spaced apart locations in said frame and in said hub.

* * * * *